United States Patent
Spasovski et al.

(10) Patent No.: US 11,697,394 B2
(45) Date of Patent: Jul. 11, 2023

(54) VEHICLE SECURITY SYSTEMS AND METHODS

(71) Applicant: Ford Global Technologies, LLC, Dearborn, MI (US)

(72) Inventors: Kiril Spasovski, Dearborn, MI (US); Shounak Athavale, Dearborn, MI (US); Flavia Rodrigues, Dearborn, MI (US); Anuja Anil Shirsat, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 553 days.

(21) Appl. No.: 16/640,140

(22) PCT Filed: Aug. 29, 2017

(86) PCT No.: PCT/US2017/049162
§ 371 (c)(1),
(2) Date: Feb. 19, 2020

(87) PCT Pub. No.: WO2019/045694
PCT Pub. Date: Mar. 7, 2019

(65) Prior Publication Data
US 2020/0238953 A1    Jul. 30, 2020

(51) Int. Cl.
*H04N 5/44*     (2011.01)
*B60R 25/31*    (2013.01)
(Continued)

(52) U.S. Cl.
CPC .............. *B60R 25/31* (2013.01); *B60R 25/24* (2013.01); *B60R 25/305* (2013.01); *B60W 60/00253* (2020.02); *G01C 21/3407* (2013.01); *G06Q 10/02* (2013.01); *G06V 20/56* (2022.01); *G06V 20/59* (2022.01); *H04W 4/02* (2013.01); *H04W 4/40* (2018.02); *B60R 2300/8006* (2013.01);
(Continued)

(58) Field of Classification Search
CPC ....... B60R 25/31; B60R 25/24; B60R 25/305; B60R 2300/8006; B60W 60/00253; B60W 2540/22; B60W 2540/221; G01C 21/3407; G06Q 10/02; G06V 20/56; G06V 20/59; H04W 4/02; H04W 4/40
See application file for complete search history.

(56) References Cited

U.S. PATENT DOCUMENTS 9,194,168 B1 * 11/2015 Lu ........................ G01C 21/26
9,256,852 B1   2/2016 Myllymaki
(Continued)

OTHER PUBLICATIONS

International Search Report of the International Searching Authority for PCT/US2017/049162 dated Jan. 2, 2018.

*Primary Examiner* — Munear T Akki
(74) *Attorney, Agent, or Firm* — Brandon Hicks; Eversheds Sutherland (US) LLP

(57) ABSTRACT

Example vehicle security systems and methods are described. In one implementation, a method receives a destination and a driving route to the destination for an autonomous vehicle to follow. A vehicle security system identifies a passkey associated with the driving route and communicates the passkey to a user designated to meet the autonomous vehicle at the destination. The vehicle security system confirms that the user designated to meet the autonomous vehicle possesses the passkey.

16 Claims, 8 Drawing Sheets

(51) Int. Cl.
  *H04W 4/40*       (2018.01)
  *B60W 60/00*      (2020.01)
  *B60R 25/24*      (2013.01)
  *B60R 25/30*      (2013.01)
  *G01C 21/34*      (2006.01)
  *G06Q 10/02*      (2012.01)
  *H04W 4/02*       (2018.01)
  *G06V 20/56*      (2022.01)
  *G06V 20/59*      (2022.01)

(52) U.S. Cl.
  CPC ... *B60W 2540/22* (2013.01); *B60W 2540/221* (2020.02)

(56) References Cited

U.S. PATENT DOCUMENTS

| | | | | |
|---|---|---|---|---|
| 9,494,938 | B1* | 11/2016 | Kemler | B60Q 1/50 |
| 9,516,460 | B2* | 12/2016 | Ambrefe, Jr. | H04W 4/029 |
| 9,552,564 | B1† | 1/2017 | Martenis | |
| 10,007,263 | B1† | 6/2018 | Fields | |
| 10,640,082 | B1* | 5/2020 | Shannon | B60R 22/48 |
| 2011/0059693 | A1* | 3/2011 | O'Sullivan | G06Q 50/30 |
| | | | | 455/41.1 |
| 2012/0083960 | A1 | 4/2012 | Zhu et al. | |
| 2012/0137257 | A1* | 5/2012 | Lalancette | G06Q 30/00 |
| | | | | 715/846 |
| 2013/0295912 | A1† | 11/2013 | Chen | |
| 2014/0070946 | A1* | 3/2014 | Ambrefe, Jr. | H04W 4/029 |
| | | | | 340/541 |
| 2014/0309891 | A1† | 10/2014 | Ricci | |
| 2015/0177007 | A1 | 6/2015 | Su et al. | |
| 2015/0337587 | A1† | 11/2015 | Lu et al. | |
| 2015/0348408 | A1* | 12/2015 | Demisse | G08G 1/017 |
| | | | | 340/933 |
| 2016/0301698 | A1† | 10/2016 | Katara et al. | |
| 2017/0080900 | A1* | 3/2017 | Huennekens | G08B 21/00 |
| 2017/0213308 | A1 | 7/2017 | Wellborn et al. | |
| 2017/0316533 | A1* | 11/2017 | Goldman-Shenhar | H04L 67/306 |
| 2018/0047057 | A1* | 2/2018 | Mayfield | G09F 21/026 |
| 2018/0164809 | A1* | 6/2018 | Moosaei | G06Q 10/02 |
| 2018/0202822 | A1* | 7/2018 | DeLizio | B60R 25/24 |
| 2018/0208151 | A1* | 7/2018 | Jimenez Hernandez | G08C 17/02 |
| 2018/0211348 | A1* | 7/2018 | Narayan | H04L 51/52 |
| 2019/0232860 | A1* | 8/2019 | Ferrone | B60Q 1/50 |
| 2019/0375409 | A1† | 12/2019 | Hunt | G01C 21/36 |
| 2020/0134672 | A1* | 4/2020 | el Kaliouby | G06V 40/176 |
| 2020/0193198 | A1* | 6/2020 | Wang | G05D 1/0011 |
| 2021/0103658 | A1* | 4/2021 | Soryal | G06F 21/51 |

\* cited by examiner
† cited by third party

VEHICLE SECURITY SYSTEMS AND METHODS

TECHNICAL FIELD

The present disclosure relates to vehicular systems and, more particularly, to systems and methods that secure the vehicle and its occupants.

BACKGROUND

Automobiles and other vehicles provide a significant portion of transportation for commercial, government, and private entities. Vehicles, such as autonomous vehicles, drive on roadways, parking lots, and other areas when transporting passengers or objects from one location to another. An example application of autonomous vehicles is operating as a taxi or shuttle service that picks up one or more passengers in response to a transportation request. When operating as a taxi or shuttle service, the autonomous vehicle drives to a pickup location such that a passenger requesting the service can enter the vehicle. The vehicle then drives to a destination and allows the passenger to exit the vehicle. In some situations, additional safety precautions are desirable, such as when transporting children without any adults in the autonomous vehicle.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
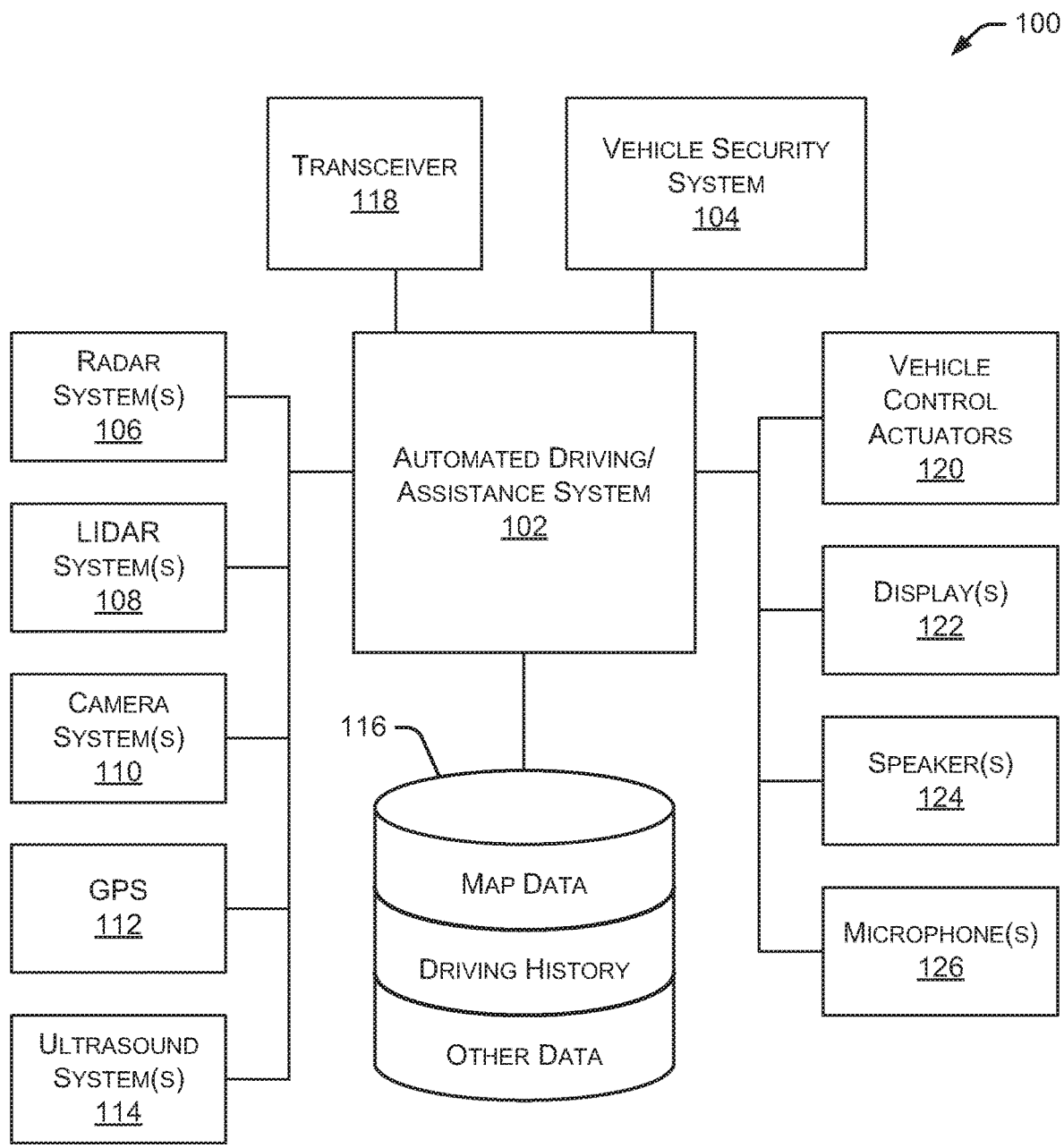
FIG. 1 is a block diagram illustrating an embodiment of a vehicle control system that includes a vehicle security system.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

FIG. 1 is a block diagram illustrating an embodiment of a vehicle control system 100 within a vehicle that includes a vehicle security system 104. An automated driving/assistance system 102 may be used to automate or control operation of a vehicle or to provide assistance to a human driver. For example, the automated driving/assistance system 102 may control one or more of braking, steering, seat belt tension, acceleration, lights, alerts, driver notifications, radio, vehicle locks, or any other auxiliary systems of the vehicle. In another example, the automated driving/assistance system 102 may not be able to provide any control of the driving (e.g., steering, acceleration, or braking), but may provide notifications and alerts to assist a human driver in driving safely. Vehicle control system 100 includes vehicle security system 104 that interacts with various components in the vehicle to control access to the vehicle in certain situations and to control driving routes followed by the vehicle. Although vehicle security system 104 is shown as a separate component in FIG. 1, in alternate embodiments, vehicle security system 104 may be incorporated into automated driving/assistance system 102 or any other vehicle component.

Vehicle control system 100 also includes one or more sensor systems/devices for detecting a presence of nearby objects (or obstacles) or determining a location of a parent vehicle (e.g., a vehicle that includes vehicle control system 100). For example, vehicle control system 100 may include one or more Radar (Radio detection and ranging) systems 106, one or more Lidar (Light detection and ranging) systems 108, one or more camera systems 110, a global positioning system (GPS) 112, and/or ultrasound systems 114. The one or more camera systems 110 may include a rear-facing camera mounted to the vehicle (e.g., a rear portion of the vehicle), a front-facing camera, and one or more side-facing cameras. Camera systems 110 may also include one or more interior cameras that capture images of the vehicle's interior, such as passengers and other objects inside the vehicle. Lidar systems 108 may include one or more interior Lidar sensors that capture data associated with the area inside the vehicle. Vehicle control system 100 may include a data store 116 for storing relevant or useful data for navigation and safety, such as map data, driving history, or other data. Vehicle control system 100 may also include a transceiver 118 for wireless communication with a mobile or wireless network, other vehicles, infrastructure, or any other communication system.

Vehicle control system 100 may include vehicle control actuators 120 to control various aspects of the driving of the vehicle such as electric motors, switches or other actuators, to control braking, acceleration, steering, seat belt tension, door locks, or the like. Vehicle control system 100 may also include one or more displays 122, speakers 124, microphones 126, or other devices so that notifications to a human driver or passenger may be provided. A display 122 may include a heads-up display, dashboard display or indicator, a display screen, or any other visual indicator, which may be seen by a driver or passenger of a vehicle. Speakers 124 may include one or more speakers of a sound system of a vehicle or may include a speaker dedicated to driver or passenger notification. Microphones 126 may include any type of microphone located inside or outside the vehicle to capture sounds originating from inside or outside the vehicle.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, automated driving/assistance system 102 is configured to control driving or navigation of a parent vehicle. For example, automated driving/assistance system 102 may control the vehicle control actuators 120 to drive a path on a road, parking lot, driveway or other location. In some embodiments, automated driving/assistance system 102 may determine a path based on information or perception data provided by any of the components 106-118. A path may also be determined based on a route that maneuvers the vehicle to avoid or mitigate a potential collision with another vehicle or object. The sensor systems/devices 106-110 and 114 may be used to obtain real-time sensor data so that automated driving/assistance system 102 can assist a driver or drive a vehicle in real-time.

Figure 2:
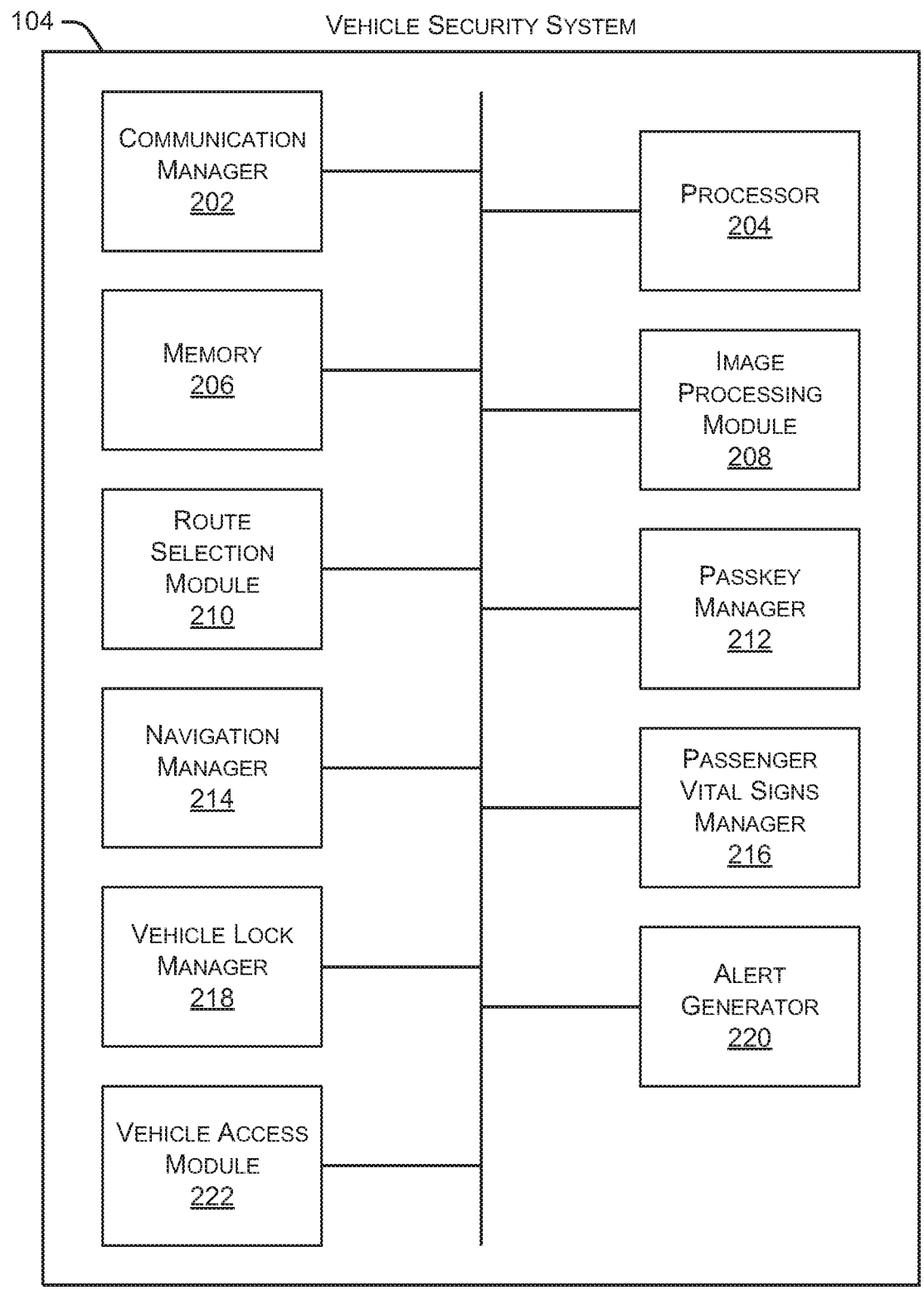
FIG. 2 is a block diagram illustrating an embodiment of a vehicle security system.

FIG. 2 is a block diagram illustrating an embodiment of vehicle security system 104. As described herein, "vehicle security system" 104 may also be referred to as a "security system." As shown in FIG. 2, vehicle security system 104 includes a communication manager 202, a processor 204, and a memory 206. Communication manager 202 allows vehicle security system 104 to communicate with other systems, such as automated driving/assistance system 102, and communicate with other users and systems external to the vehicle. Processor 204 executes various instructions to implement the functionality provided by vehicle security system 104, as discussed herein. Memory 206 stores these instructions as well as other data used by processor 204 and other modules and components contained in vehicle security system 104.

Additionally, vehicle security system 104 includes an image processing module 208 that receives image data from one or more camera systems 110. Vehicle security system 104 may receive images associated with the interior of the vehicle (e.g., passengers in the vehicle) or associated with areas outside the vehicle (e.g., people or objects located near the exterior of the vehicle). The image data may include one or more still images, a sequence of still images captured over a period of time, or a video stream, such as live video streams or recorded video streams. As discussed herein, image processing module 208 identifies or analyzes people or objects in the image data and may determine a person's emotional state or level of stress. Image processing module 208 may also communicate image data, such as live video streams, via communication manager 202 to a remote user. For example, image processing module 208 may communicate live video stream data showing a child passenger in the vehicle to a parent of the child passenger. In some embodiments, image processing module 208 includes an image management algorithm or process that performs one or more functions, such as the functions discussed herein.

Vehicle security system 104 also includes a route selection module 210 that can automatically identify one or more routes to a particular destination. Additionally, route selection module 210 allows a user (such as a parent of a child passenger) to define a particular route for an autonomous vehicle to follow when driving to a destination. For example, if a child is riding alone in an autonomous vehicle, the parent of the child may select a route that follows main roads, avoids highways, and avoids potentially dangerous areas of town. A passkey manager 212 handles the creation, distribution, and verification of one or more passkeys. As discussed herein, passkeys are used to control access to an autonomous vehicle (e.g., controlling who can access the autonomous vehicle at a destination to take custody of a child traveling in the autonomous vehicle). In some embodiments, passkey manager 212 may generate a passkey for a specific autonomous vehicle transportation activity, communicate the passkey to a person designated to take custody of the child at the destination, and, when the autonomous vehicle reaches the destination, verify that the person at the destination has the proper passkey before unlocking the doors of the autonomous vehicle. As discussed herein, the passkey represents any type of digital key or cryptographic key to secure access to the autonomous vehicle. For example, the passkey may include public and private key pairs.

A navigation manager 214 assists the autonomous vehicle when following a selected route to a destination. In some situations, the autonomous vehicle must change its route due to road closures, road construction, or traffic accidents. In these situations, navigation manager 214 can assist with rerouting the autonomous vehicle and, if necessary, communicating with a parent of a child passenger to confirm the alternate route recommendation.

Vehicle security system 104 also includes a passenger vital signs manager 216 that monitors one or more vital signs of a passenger (e.g., a child passenger) as discussed herein. In some embodiments, passenger vital signs manager 216 monitors vital signs such as heart rate, respiration rate, and the like. For example, heart rate sensors in a seat or seatbelt can detect heart rate alone or in combination with image data from one or more cameras. Additionally, the image data may be used to analyze the passenger's breathing and level of awareness (e.g., whether the passenger is crying, screaming, or passed out). Also, passenger vital signs manager 216 may monitor a passenger's stress level, emotional status, and the like. For example, the passenger's stress level, emotional status, and so forth can be estimated based on heart rate, breathing, level of awareness, and the like.

A vehicle lock manager 218 controls the locking and unlocking of doors, trunks, hatches, and other vehicle access points associated with an autonomous vehicle. For example, when an autonomous vehicle arrives at a destination with a child passenger, vehicle lock manager 218 may keep the vehicle doors locked until it is specifically instructed to unlock the doors by passkey manager 212 or another vehicle system or component. An alert generator 220 generates one or more alerts based on particular situations associated with the autonomous vehicle and its surroundings. For example, an alert may be generated and communicated to a parent if an autonomous vehicle traveling with a child needs to change routes or experiences significant delays. Additionally, alert generator 220 may generate an alert if the autonomous vehicle arrives at the destination but there is no person at the destination with the appropriate passkey. In some embodiments, alert generator 220 generates an alert for a parent if a child passenger is determined to be distressed or anxious.

A vehicle access module 222 determines when a person (e.g., a passenger or a person picking up a passenger at a destination) can access an autonomous vehicle. In some embodiments, vehicle access module 222 may prevent access to an autonomous vehicle when traveling with a child passenger. After the autonomous vehicle reaches the desired destination and the proper passkey is validated, vehicle access module 222 may permit access to the autonomous vehicle by the person with the passkey by instructing vehicle lock manager 218 to unlock one or more doors of the autonomous vehicle.

Figure 3:
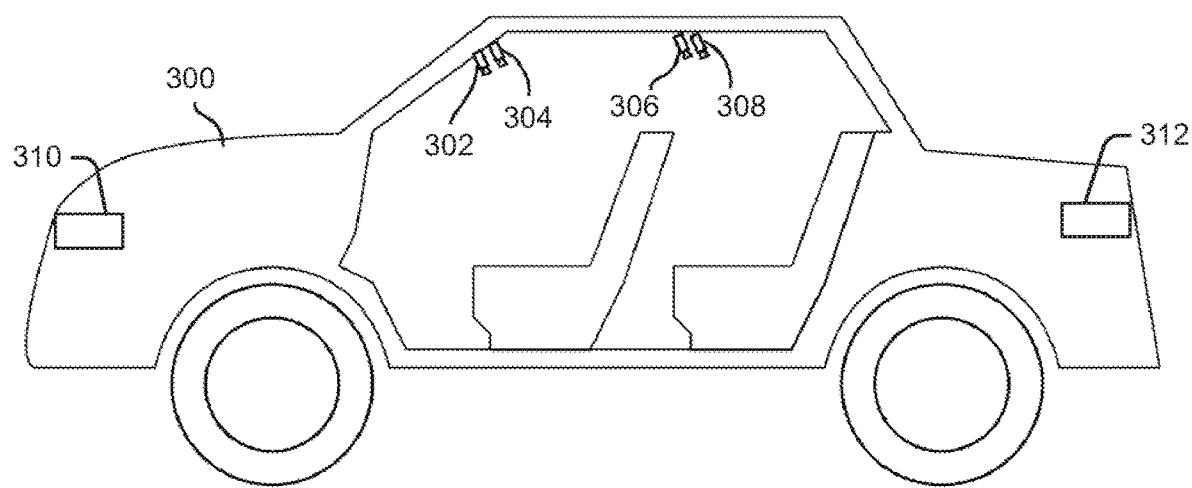
FIG. 3 illustrates an embodiment of a vehicle with multiple cameras and other sensors to monitor the interior and exterior of the vehicle.

FIG. 3 illustrates an embodiment of a vehicle 300 with multiple cameras and other sensors to monitor the interior and exterior of the vehicle. In some embodiments, vehicle 300 may operate as an autonomous vehicle and perform at least a portion of the functions and operations discussed herein. As shown in FIG. 3, vehicle 300 has two interior cameras 302 and 306 as well as two interior sensors 304, 308. In some embodiments, cameras 302, 306 are positioned and oriented in vehicle 300 such that passenger seating locations are in the field of view of at least one camera 302, 306. Other areas of the interior of vehicle 300 may also be in the field of view of one or more cameras 302, 306. Sensors 304, 308 represent any type of sensor associated with, for example, radar systems 106, Lidar systems 108, ultrasound systems 114, and the like. In some embodiments, data captured by sensors 304, 308 is used in combination with data captured by cameras 302, 306 to identify passengers in vehicle 300 as well as the emotional state of the identified passengers. Although two interior cameras 302, 306 are shown in FIG. 3, in alternate embodiments, vehicle 300 may have any number of interior cameras positioned in various locations throughout the vehicle and aimed at different angles. Similarly, although two interior sensors 304, 308 are shown in FIG. 3, in alternate embodiments, vehicle 300 may have any number of interior sensors positioned in various locations throughout the vehicle.

Vehicle 300 also includes two exterior cameras 310 and 312 which are positioned and oriented such that areas outside the vehicle, but close to the vehicle, are in the field of view of at least one camera 310, 312. Although not shown in FIG. 3, in some embodiments, vehicle 300 also includes one or more exterior sensors, such as sensors associated with radar systems 106, Lidar systems 108, ultrasound systems 114, and the like.

Figure 4A:
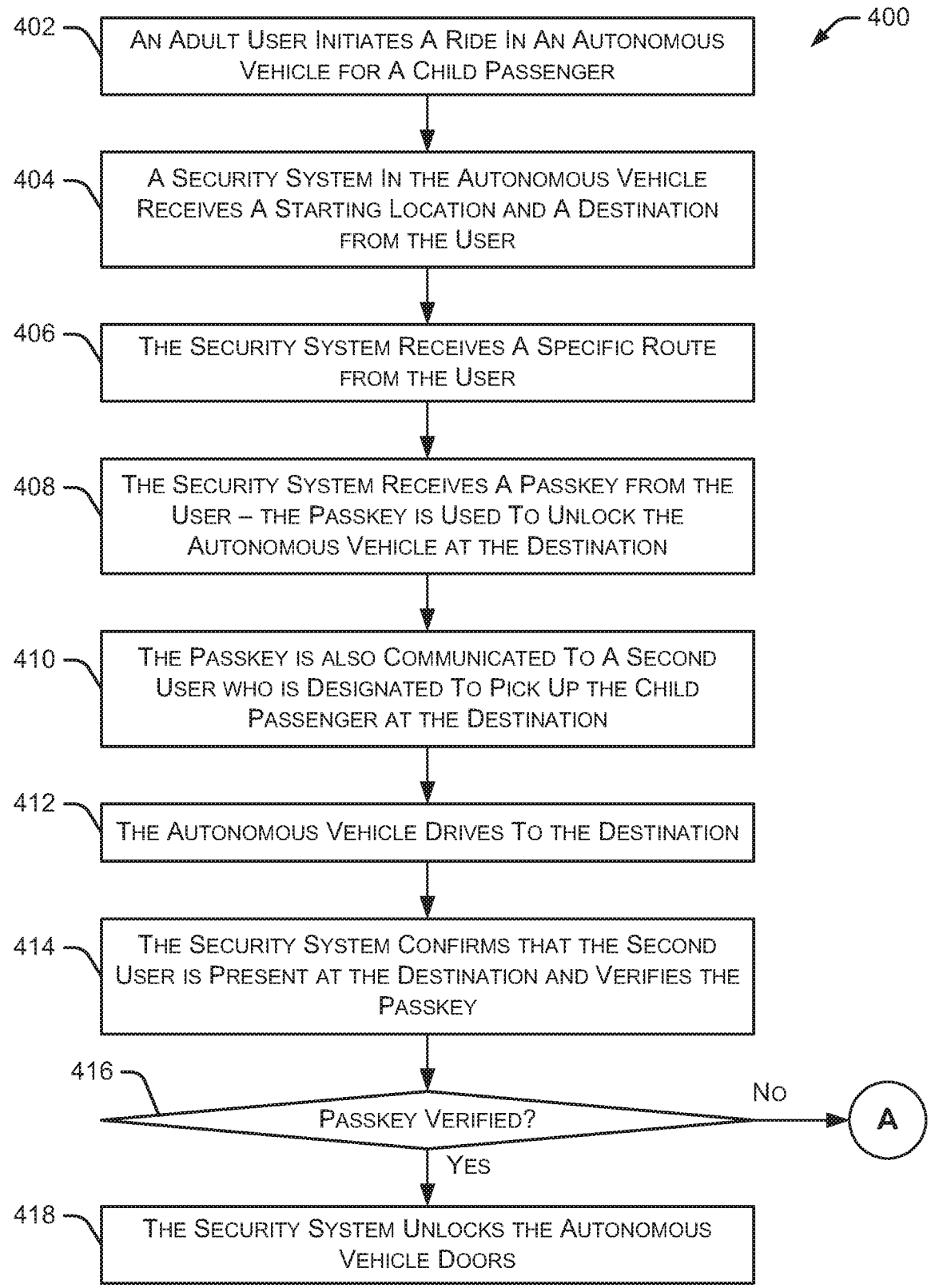
FIGS. 4A-4B illustrate an embodiment of a method for providing secure transport of a child in an autonomous vehicle to a destination.
Figure 4B:
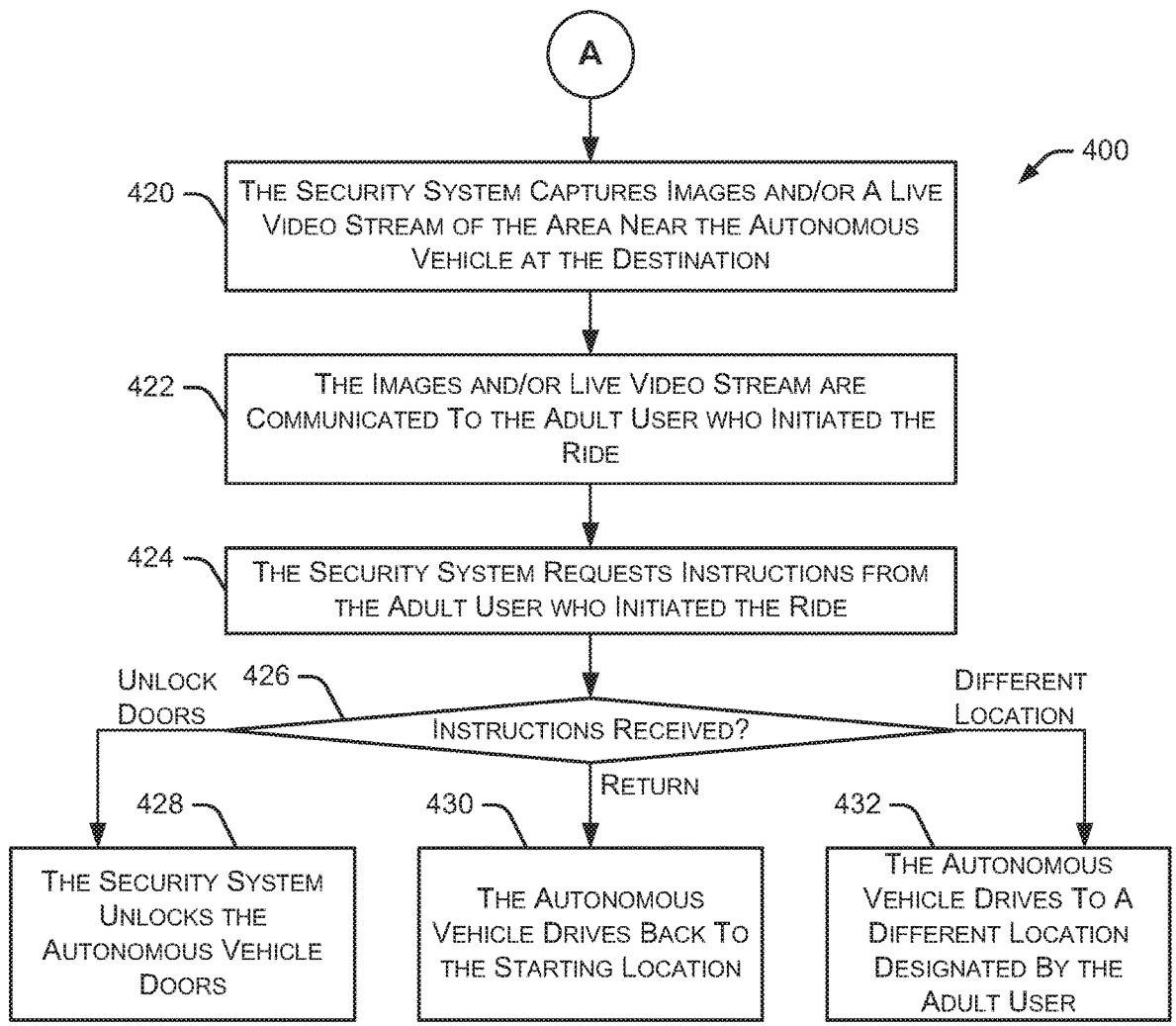

FIGS. 4A-4B illustrate an embodiment of a method 400 for providing secure transport of a child in an autonomous vehicle to a destination. Initially, an adult user initiates 402 a ride in an autonomous vehicle for a child passenger. For example, the adult user may initiate 402 the ride using a smartphone application or otherwise interacting with an autonomous vehicle or a scheduling service associated with a fleet of autonomous vehicles. Method 400 continues as a security system in the autonomous vehicle receives 404 a starting location and a destination from the user. In some embodiments, the starting location is the user's current location. The starting location and the destination may be communicated to the security system via a smartphone application operated by the user or any other user interface that allows the user to identify the starting location and destination.

The security system in the autonomous vehicle also receives 406 a specific route from the user. For example, the user may specify particular roads to follow (or particular areas to avoid) when the autonomous vehicle drives to the destination. In some embodiments, the user may prefer that the autonomous vehicle follow main roads, avoid highways, and avoid certain parts of town or certain geographic areas. In particular implementations, the user may specify a particular route by drawing on a map or graphically highlighting particular roads to follow to the destination.

The security system also receives 408 passkey from the user (e.g., the user's smartphone application). As discussed herein, the passkey is used to unlock the autonomous vehicle at the destination if an appropriate person is present who possesses the passkey. In some embodiments, the passkey is generated by passkey manager 212 (FIG. 2). In particular embodiments, the passkey is associated with a particular ride (or a particular route) in an autonomous vehicle. For example, the passkey is used to validate a person picking up a child from the autonomous vehicle at the destination. After that ride is complete, the passkey is deleted. A new passkey is generated for each future ride initiated by a user. The passkey is also communicated 410 to a second user who is designated to meet the autonomous vehicle at the destination and pick up (e.g., take custody of) the child passenger at the destination. In some embodiments, the passkey is communicated to a smartphone or other device controlled by the second user.

In some embodiments, any type of computing device may be used to initiate 402 the ride. When initiating 402 the ride, the adult user may upload photos of their face as well as the face of the person who will meet the autonomous vehicle at the destination. A biometric identity may be created to authenticate the person who will meet the autonomous vehicle at the destination.

The autonomous vehicle then drives 412 to the destination. After the autonomous vehicle arrives at the destination, the security system confirms 414 that the second user is present at the destination and verifies the passkey. For example, the security system confirms 414 that the second user has a smartphone or other device that contains the appropriate passkey. If the passkey is verified 416, the security system unlocks 418 the autonomous vehicle doors so the child passenger can exit the autonomous vehicle. In some embodiments, the security system deletes or deactivates the passkey after the autonomous vehicle is unlocked and the child passenger exits the autonomous vehicle. In alternate embodiments, the security system may confirm that the second user is present at the destination based on detecting a phone number associated with the second user's mobile device or by requiring the second user to provide a specific code that was pre-approved by the adult user who initiated the ride. In other embodiments, the security system confirms the second user based on facial recognition (e.g., a facial biometric identity) by the security system or facial recognition by the adult user who initiated the ride.

In some embodiments, in addition to unlocking 418 the autonomous vehicle doors, the security system also unlocks (or releases) a "smart" seat belt that is restraining the child passenger. The smart seat belt can be unlocked or released by a remote computing system, such as vehicle control system 100.

If the passkey is not verified 416, the security system was not able to confirm that the second user is present to take custody of the child passenger. In this situation, the security system captures 420 images and/or a live video stream of the area near the autonomous vehicle at the destination. The images and/or live video stream may include interior portions of the autonomous vehicle and/or exterior areas near the vehicle. The images and/or live video stream are communicated 422 to the adult user who initiated the ride. The images and/or live video stream allow the adult user who initiated the ride to analyze the situation inside and outside the autonomous vehicle at the destination. If the adult user who initiated the ride sees the second user at the destination, they may allow the autonomous vehicle's doors to be unlocked. However, if the adult user who initiated the ride does not see the second user a the destination, they may instruct the autonomous vehicle to return back to the starting location or drive to a different location.

In this situation , the security system requests 424 instructions from the adult user who initiated the ride. As discussed above, the security system may request instructions including whether to unlock the doors, return the autonomous vehicle to the starting location, or drive the autonomous vehicle to a different location. Based on the instructions received 426, the security system may unlock the autonomous vehicle doors 428, instruct the autonomous vehicle to drive 430 back to the starting location, or instruct the autonomous vehicle to drive 432 to a different location designated by the adult user who initiated the ride. In some embodiments, the different location designated by the adult user who initiated the ride may include a different drop off location, a police station, a school, and the like. In particular implementations, the security system may generate a new passkey associated with the return drive back to the starting location or associated with the route to the different location. In these implementations, the new passkey is communicated to the person approved to take custody of the child passenger at the starting location or the different location.

As described in FIGS. 4A-4B, the security system captures 420 images and/or a live video stream of the area near the autonomous vehicle if the passkey is not verified at 416. In alternate embodiments, the security system captures 420 images and/or a live video stream of the area near the autonomous even if the passkey was verified at 416. Additionally, the images and/or live video data are communicated 422 to the adult user who initiated the ride, thereby allowing the adult user to analyze the situation at the destination (e.g., the activities going on near the autonomous vehicle) before approving the security system to unlock the autonomous vehicle doors. If the adult user who initiated the ride is not comfortable with the situation at the destination, they can instruct the autonomous vehicle to return to the starting location or drive to a different location, as discussed above with respect to 420-432.

Figure 5:
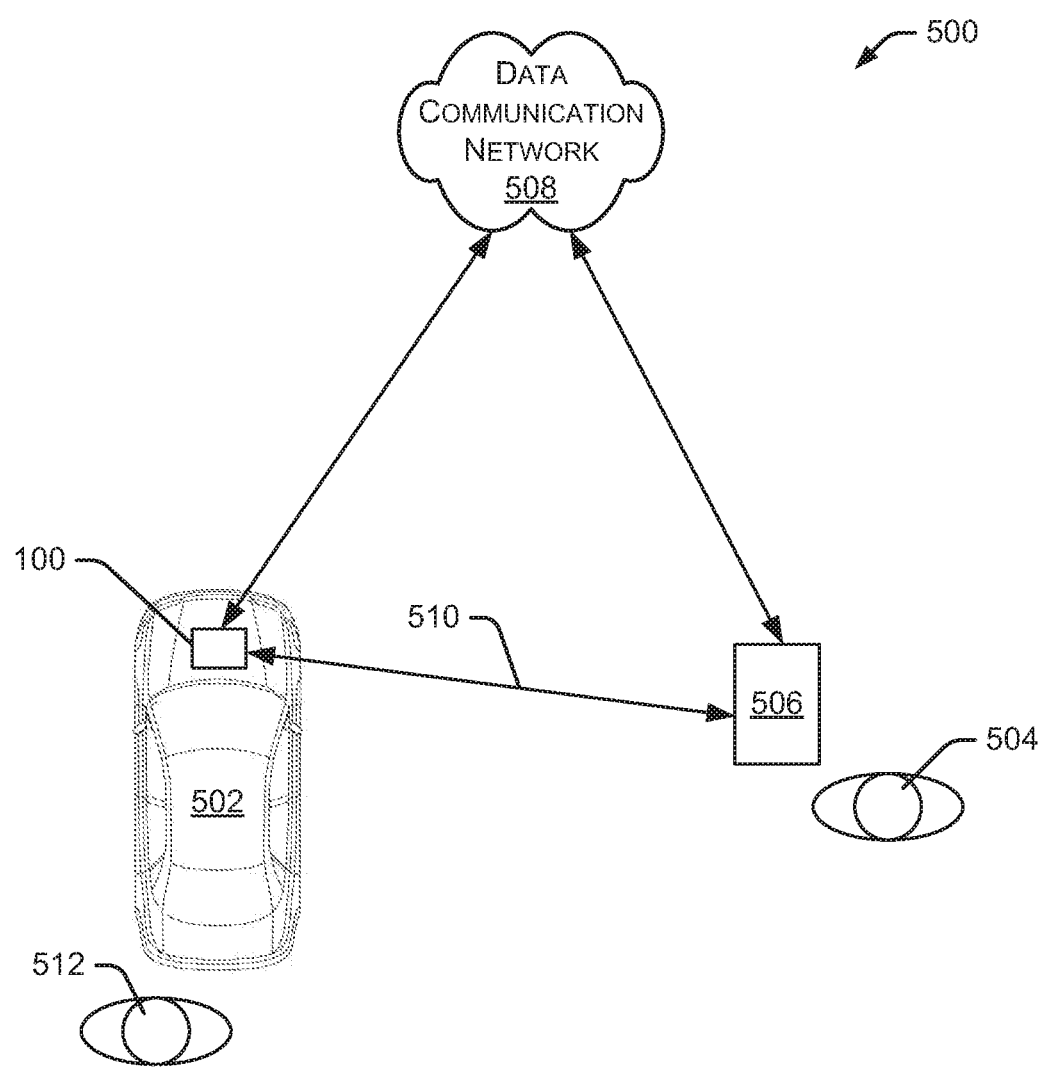
FIG. 5 is a block diagram illustrating an embodiment of validating a user who is picking up a child in an autonomous vehicle at a destination.

FIG. 5 is a block diagram illustrating an embodiment 500 of validating a user who is picking up a child in an autonomous vehicle at a destination. The example of FIG. 5 shows an autonomous vehicle 502 after it has arrived at a destination, such as a destination identified by an adult user who initiates a ride in autonomous vehicle 502 for a child passenger. Autonomous vehicle 502 contains vehicle control system 100 (which includes vehicle security system 104), as discussed herein. A user 504 is present at the destination and is operating a mobile device 506, such as a smartphone, tablet computer, or other computing system. Mobile device 506 communicates with vehicle control system 100 via a data communication network 508 or a communication link 510. In some embodiments, data communication network 508 includes a cellular communication network, the Internet, or any combination of two or more communication networks. Communication link 510 includes any type of communication link using any communication protocol, such as Bluetooth®, WiFi, DSRC (Dedicated Short-Range Communications) ,and the like. In some embodiments, mobile device 506 communicates with vehicle control system 100 via communication link 510 using TCP/IP (Transmission Control Protocol/Internet Protocol). For example, TCP can create message packets that are transmitted over IP.

As discussed herein, if user 504 is intended to pick up the child passenger (as determined by the adult user who initiated the ride), user 504 should have received an appropriate passkey when the ride was initiated. For example, user 504 may receive the passkey in their mobile device 506 using an application executing on mobile device 506 or some other passkey management system or procedure. When autonomous vehicle 502 arrives at the destination, vehicle security system 104 in vehicle control system 100 may attempt to communicate with mobile device 506 and verify that mobile device 506 contains the appropriate passkey for the specific ride associated with the child passenger. If mobile device 506 contains the appropriate passkey, vehicle security system 104 unlocks the doors of autonomous vehicle 502 so user 504 can take custody of the child passenger. However, if mobile device 506 does not contain the appropriate passkey, vehicle security system 104 keeps the doors of autonomous vehicle 502 locked to protect the child passenger. For example, when the vehicle arrives at the destination, vehicle control system 100 will send an alert to mobile device 506 operated by user 504. Mobile device 506 then attempts to provide an authentication signal or communication. This authentication may be a cloud-based authentication process (where both vehicle control system 100 and mobile device 506 communicate with a cloud-based server) or mobile device 506 communicates the passkey directly to vehicle control system 100.

In the example of FIG. 5, another person 512 is located near the back of autonomous vehicle 502. In some embodiments, one or more vehicle cameras or other sensors may detect this person and communicate images (still image data or video data) to a user who initiated the ride. That user can view the images and determine whether to unlock the doors of autonomous vehicle 502. For example, if person 512 appears to be hiding behind autonomous vehicle 502 or if the user who initiated the ride is fearful of person 512, the user who initiated the ride may instruct autonomous vehicle 502 to keep the doors locked and drive to a different location (e.g., an alternate drop off location or return to the starting location). If the user who initiated the ride knows person 512 or is not concerned about the presence of person 512, they can instruct autonomous vehicle 502 to unlock the doors and allow the child passenger to exit autonomous vehicle 502.

Figure 6:
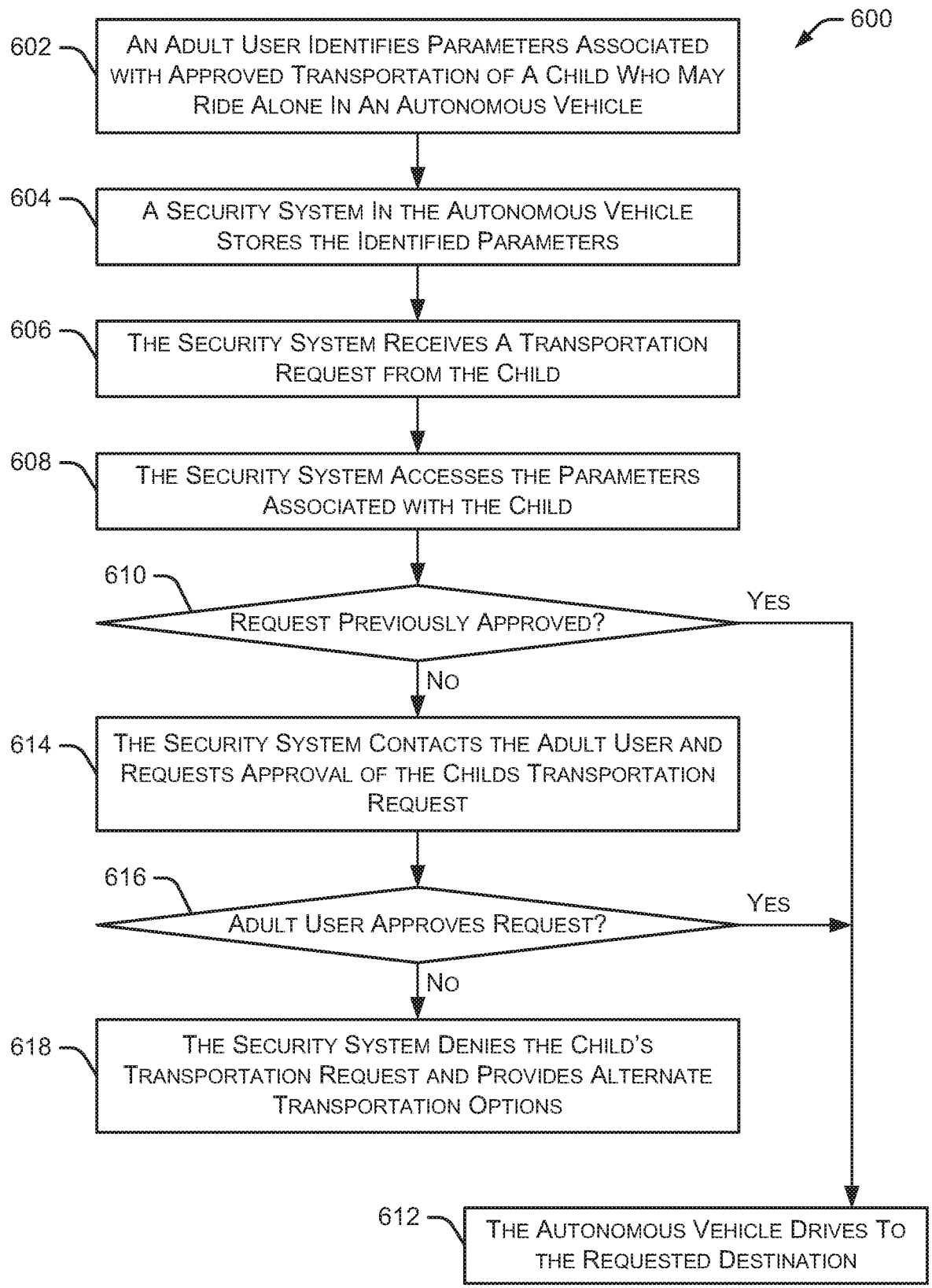
FIG. 6 illustrates an embodiment of a method for controlling access to an autonomous vehicle by a child.

FIG. 6 illustrates an embodiment of a method 600 for controlling access to an autonomous vehicle by a child. For example, method 600 may be appropriate for transporting older children, such as children aged 14-18. Initially, an adult user identifies 602 parameters associated with approved transportation of a child who may ride alone in an autonomous vehicle. Example parameters include time of day, day of week, approved pickup locations, approved drop off locations, and the like. Some parameters may include multiple factors, such as the child may be approved to be picked up at school Monday-Friday between 3:00-4:00 pm. The identified parameters are stored 604 by a security system in the autonomous vehicle. In some embodiments, the identified parameters may be stored in a database, a remote server, a remote storage system, or other storage mechanism that is accessible by one or more users and one or more autonomous vehicles. The parameters may be retrieved in by autonomous vehicles transporting the child in the future. In particular implementations, the adult user identifies the parameters using a smartphone application, accessing a web site, and the like. In some embodiments, any modifications to the parameters are restricted to the adult who identified the parameters or another person given permission by that adult.

Method 600 continues as the security system receives 606 a transportation request from the child (e.g., a child of the adult user who identified the approved transportation parameters). The security system accesses 608 the parameters associated with the child and determines 610 whether the child's transportation request was previously approved based on the accessed parameters. If the child's transportation request was previously approved based on the accessed parameters, the autonomous vehicle drives 612 to the requested destination. However, if the child's transportation request was not previously approved (e.g., the transportation request does not satisfy an existing parameter), then the security system contacts 614 the adult user who identified the parameters and requests approval of the child's transportation request. In alternate embodiments, other adult users may be contacted 614 to approve the child's transportation request. In some examples, the request for approval of the child's transportation request may be a message or alert communicated to the adult user that indicates the name of the child requesting transportation, the requested pickup location and the requested drop off location. The adult user an approve the request, disapprove the request, or modify the request (e.g., approve the pickup location, but provide a different drop off location).

If the adult user approves 616 the request, the autonomous vehicle drives 612 to the requested destination (or an alternate destination provided by the adult user). However, if the adult user disapproves the request, the security system denies 618 the child's transportation request and provides alternate transportation options. The alternate transportation options may include, for example, an alternate pickup and/or drop off location provided by an adult user. Additionally, the alternate transportation options may include pickup and/or drop off locations that were previously approved based on the current day of the week, time of day, and the like. In some embodiments, when a child is being transported based on an approved transportation request, the autonomous vehicle is prevented from making additional stops, such as letting the child out of the vehicle at an unapproved location.

Additionally, when the child is being transported based on an approved transportation request, the autonomous vehicle may be prevented from allowing other passengers to enter the autonomous vehicle. These restrictions may be overridden by the adult user on a case-by-case basis.

In some embodiments, the child passenger may be required to approve unlocking the autonomous vehicle's doors at the destination. For example, the child passenger may confirm that the autonomous vehicle is at the correct destination and the child feels safe exiting the autonomous vehicle. If confirmed, the child passenger approves unlocking of the autonomous vehicle doors by activating an appropriate button, voice command, and the like. If the child passenger does not feel safe exiting the autonomous vehicle, the child may request a different destination or the vehicle security system contacts the adult user to receive further instructions.

Figure 7:
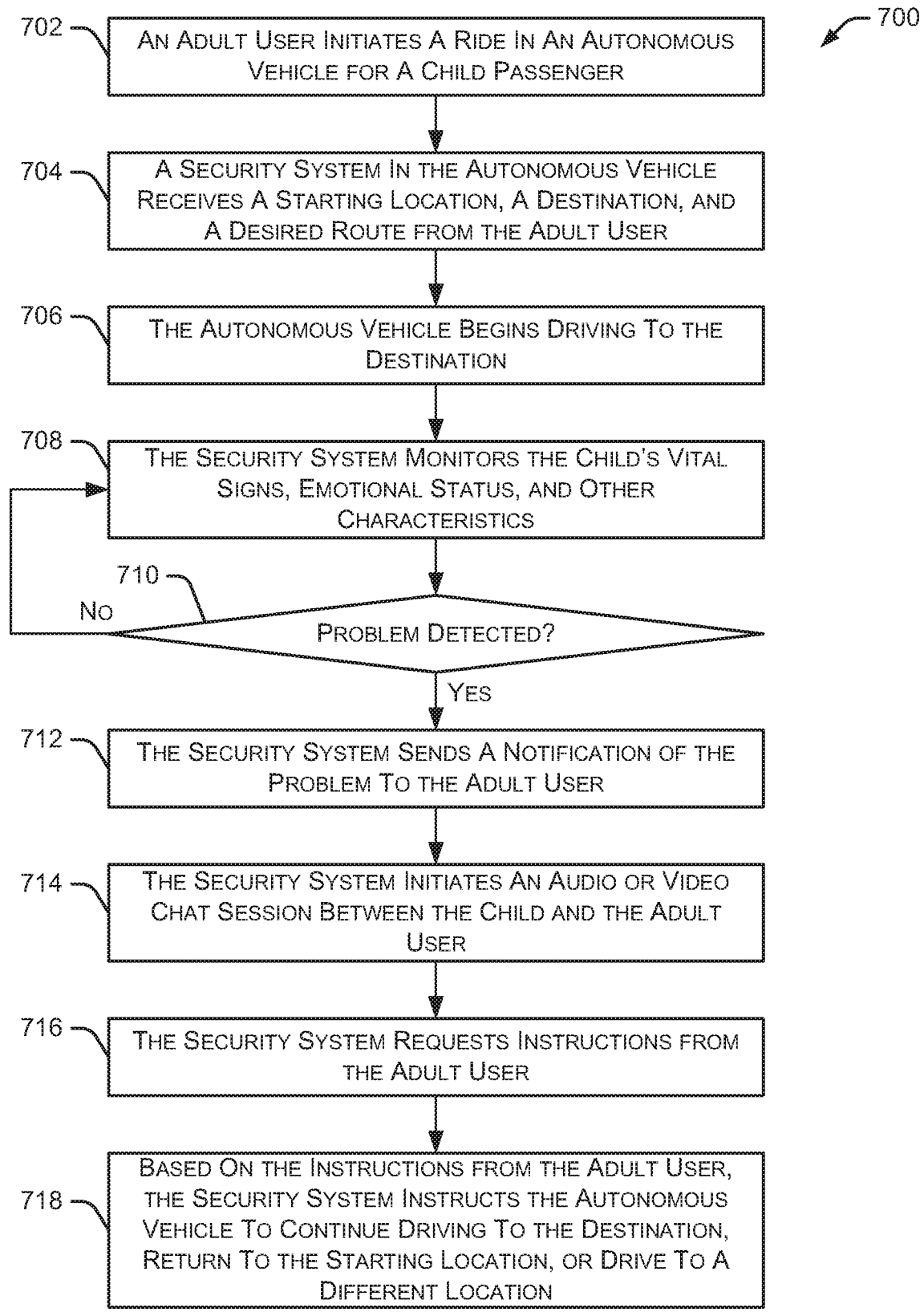
FIG. 7 illustrates an embodiment of a method for monitoring a child riding in an autonomous vehicle and detecting potential problems with the child.

FIG. 7 illustrates an embodiment of a method 700 for monitoring a child riding in an autonomous vehicle and detecting potential problems with the child. Initially, an adult user initiates 702 a ride in an autonomous vehicle for a child passenger. A security system in the autonomous vehicle receives 704 a starting location, a destination, and a desired route (from the starting location to the destination) from the adult user. The autonomous vehicle begins driving 706 to the destination following the desired route. While the autonomous vehicle is driving to the destination, the security system monitors 708 the child's vital signs, emotional status, and other characters to detect a problem with the child, such as a high stress level, illness, a medical condition, and the like.

If a problem is detected 710, the security system sends 712 a notification of the problem to the adult user (e.g., via a text message, a phone call, an alert sent to a mobile device application, and the like). The notification may include a location of the autonomous vehicle, details regarding the problem detected, and images (still image data or a live video stream) showing the face and body of the child passenger. Additionally, the security system may initiate 714 an audio or video chat session between the child and the adult user. This audio or video chat session allows the child to talk with the adult user and explain how they are feeling. For example, if the child has a high stress level, the adult user may calmly talk to the child to determine the cause of the stress and try to calm the child. After initiating 714 the chat session, the security system requests 716 instructions from the adult user regarding whether the autonomous vehicle should continue to the destination. In some embodiments, the adult user may provide instructions to the security system such as continue to the destination, return to the starting location, or drive to a different location (e.g., a police station, a hospital, a school, and the like). Based on the instructions from the adult user, the security system instructs 718 the autonomous vehicle to continue driving to the destination, return to the starting location, or drive to a different location.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:
receiving, by a vehicle security system and from a first user, a destination and a driving route to the destination for an autonomous vehicle to follow while transporting a passenger, the passenger requiring guardianship upon arriving at the destination;
identifying, by the vehicle security system, a passkey associated with the driving route;
communicating the passkey to a user designated to meet the autonomous vehicle at the destination;
confirming, by the vehicle security system, that the user designated to meet the autonomous vehicle possesses the passkey; and
unlocking doors of the autonomous vehicle at the destination responsive to confirming that the user designated to meet the autonomous vehicle possesses the passkey and is at the destination in order to allow the user designated to meet the autonomous vehicle to take custody of the passenger.

2. The method of claim 1, wherein the autonomous vehicle follows the driving route to the destination.

3. The method of claim 1, further comprising:
capturing images or live video of an interior of the autonomous vehicle; and
communicating the captured images or live video to the first user.

4. The method of claim 3, further comprising receiving instructions from the first user indicating whether to unlock the doors of the autonomous vehicle at the destination after communicating the captured images or live video to the first user.

5. The method of claim 3, further comprising receiving instructions from the first user after communicating the captured images or live video to the first user, wherein the received instructions include one of an instruction to unlock the doors of the autonomous vehicle, an instruction to return the autonomous vehicle to a starting location of the driving route, and an instruction to drive the autonomous vehicle to a different location.

6. The method of claim 1, further comprising:
capturing images or live video of an area near the autonomous vehicle and external to the autonomous vehicle; and
communicating the captured images or live video to the first a user who determined the destination and the driving route, wherein unlocking the doors of the autonomous vehicle is further performed based on confirming that the user designated to meet the autonomous vehicle appears in the captured images or live video.

7. The method of claim 6, further comprising receiving instructions from the first user indicating whether to unlock the doors of the autonomous vehicle at the destination after communicating the captured images or live video to the first user.

8. The method of claim 6, further comprising receiving instructions from the first user after communicating the captured images or live video to the first user, wherein the received instructions include one of an instruction to unlock the doors of the autonomous vehicle, an instruction to return the autonomous vehicle to a starting location of the driving route, and an instruction to drive the autonomous vehicle to a different location.

9. The method of claim 1, further comprising monitoring at least one of a passenger's vital signs or a passenger's emotional status.

10. The method of claim 9, further comprising:
generating an alert indicating a problem associated with the passenger based on a problem detected with the passenger's vital signs or emotional status; and
communicating the alert to the first user.

11. The method of claim 9, further comprising initiating an audio chat session or a video chat session between the passenger and the first user.

12. An apparatus comprising:
a communication manager configured to receive, from an adult user, a destination and a driving route to the destination for an autonomous vehicle to follow with a child passenger, the child passenger requiring guardianship upon arriving at the destination;
a passkey manager configured to identify a passkey associated with the driving route, wherein the communication manager is further configured to communicate the passkey to a user designated to meet the autonomous vehicle at the destination, and wherein the passkey manager is further configured to confirm that the user designated to meet the autonomous vehicle at the destination possesses the passkey and is at the destination; and
a vehicle lock manager configured to unlock doors of the autonomous vehicle responsive to the passkey manager confirming that the user designated to meet the autonomous vehicle at the destination possesses the passkey and is at the destination in order to allow the user designated to meet the autonomous vehicle to take custody of the child passenger.

13. The apparatus of claim 12, further comprising an image processing module configured to:
capture images or live video of an interior of the autonomous vehicle; and
communicate the captured images or live video to the adult user, wherein unlocking the doors of the autonomous vehicle is further performed based on confirming that the user designated to meet the autonomous vehicle appears in the captured images or live video.

14. The apparatus of claim 13, wherein the communication manager further receives instructions from the adult user indicating whether to unlock the doors of the autonomous vehicle at the destination after the adult user receives the captured images or live video.

15. The method of claim 1, further comprising unlocking a seat belt restraining the passenger responsive to confirming that the user designated to meet the autonomous vehicle possesses the passkey and is at the destination.

16. The method of claim 1, further comprising creating a biometric identity used to authenticate the user designated to meet the autonomous vehicle at the destination, the biometric identity used in place of the passkey.

* * * * *